(12) United States Patent
Barth

(10) Patent No.: US 8,181,051 B2
(45) Date of Patent: May 15, 2012

(54) ELECTRONIC APPARATUS AND METHOD OF CONSERVING ENERGY

(75) Inventor: Andrew Barth, Aston Clinton (GB)

(73) Assignee: Freescale Semiconductor, Inc., Austin, TX (US)

( * ) Notice: Subject to any disclaimer, the term of this patent is extended or adjusted under 35 U.S.C. 154(b) by 877 days.

(21) Appl. No.: 12/278,476

(22) PCT Filed: Feb. 9, 2006

(86) PCT No.: PCT/EP2006/001303
§ 371 (c)(1),
(2), (4) Date: Aug. 6, 2008

(87) PCT Pub. No.: WO2007/090431
PCT Pub. Date: Aug. 16, 2007

(65) Prior Publication Data
US 2009/0031156 A1 Jan. 29, 2009

(51) Int. Cl.
G06F 1/00 (2006.01)
(52) U.S. Cl. .................................. 713/323; 713/330
(58) Field of Classification Search .................. 713/310, 713/320, 321, 322, 324, 323, 340, 375
See application file for complete search history.

(56) References Cited

U.S. PATENT DOCUMENTS

| 5,954,820 | A | 9/1999 | Hetzler | |
|---|---|---|---|---|
| 6,553,501 | B1 * | 4/2003 | Yokoe | 713/320 |
| 7,080,267 | B2 * | 7/2006 | Gary et al. | 713/300 |
| 7,281,144 | B2 * | 10/2007 | Banginwar et al. | 713/320 |
| 7,613,941 | B2 * | 11/2009 | Samson et al. | 713/323 |
| 7,725,750 | B2 * | 5/2010 | Ashish et al. | 713/323 |
| 7,895,459 | B2 * | 2/2011 | Goodnow et al. | 713/340 |
| 2003/0084353 | A1 * | 5/2003 | Chang et al. | 713/300 |
| 2003/0105983 | A1 * | 6/2003 | Brakmo et al. | 713/320 |
| 2005/0259683 | A1 * | 11/2005 | Bishop et al. | 370/468 |

FOREIGN PATENT DOCUMENTS

EP 0751512 A 1/1997

OTHER PUBLICATIONS

Benini et al; "A survey of design techniques for system-level dynamic power management" Very Large Scale Integration (VLSI) Systems, IEEE Transactions on vol. 8, Issue 3, Jun. 2000 pp. 299-316.
Swaminathan et al; "Energy-conscious, deterministic I/O device scheduling in hard real-time systems" Computer-Aided Design of Integrated Circuits and Systems, IEEE Transactions on vol. 22, Issue 7, Jul. 2003 pp. 847-858.
Chiasserini et al; "Improving energy saving in wireless systems by using dynamic power management" Wireless Communications, IEEE Transactions on vol. 2, Issue 5, Sep. 2003 pp. 1090-1100.
Chi-Hong et al; "A predictive system shutdown method for energy saving of event-driven computation" Computer-Aided Design, 1997. Digest of Technical Papers., 1997 IEEE/ACM International Conference on Nov. 9-13, 1997 pp. 28-32.

* cited by examiner

Primary Examiner — Thomas Lee
Assistant Examiner — Phil Nguyen

(57) ABSTRACT

An electronic apparatus and a method of conserving energy comprises providing an energy-conservation module to control use of one or more energy-saving mechanism by a hardware element. The energy-conservation module comprises a performance estimation module that estimates a performance level requirement of the hardware element and a slack time. A cost-benefit qualifier module is provided that uses one or more generic algorithm and at least one separate record that characterizes power use and performance by the hardware element in relation to a Performance Power state of the selected energy-saving mechanism in order to determine an existence of an energy saving. The cost-benefit qualifier module sets the hardware element to use the Performance Power state of the selected energy-saving mechanism if the energy-saving exists.

20 Claims, 5 Drawing Sheets

ELECTRONIC APPARATUS AND METHOD OF CONSERVING ENERGY

FIELD OF THE INVENTION

This invention relates to an electronic apparatus of the type, for example, that comprises a replenishable power source, such as a battery or fuel cell. The present invention also relates to a method of conserving energy of the type, for example, supplied by a replenishable power source, such as a battery or a fuel cell.

BACKGROUND OF THE INVENTION

In the field of portable electronic devices, it is known to enable freedom from tethering to a mains power source by providing a portable electronic device with a capability to use batteries or fuel cells, either disposable or rechargeable.

Consequently, an important consideration in relation to the portable device is power consumption as this impacts upon how quickly the energy of the battery is depleted and hence the amount of time for which the portable device can be used.

Despite gradual improvements in recent decades, battery technology has not kept pace with power consumption demands of the latest portable electronic devices, like hand-held computing devices and third generation (3G) mobile phones. Hardware designers are therefore using advanced power—saving mechanisms to help minimise Integrated Circuit (IC) and system power consumption.

In this respect, new generations of applications processors, baseband processors, power management ICs and other platform components now include the advanced power management hardware mechanisms, for example Dynamic Frequency Scaling (DFS), Dynamic Voltage Scaling (DVS), and multiple idle modes such as so-called "Wait", "Deep Sleep" and/or "Hibernate" modes. Power reduction and energy conservation is achieved by placing hardware blocks into lower power states, where performance is also lower or non-existent. To do this dynamically while programs are running requires an accurate knowledge of ever-changing workload that software being executed requires of various blocks of hardware making up the portable device, for example a processor and/or peripherals. Therefore, most of the above mechanisms do not yield significant energy conservation, and thus better battery life, unless intelligent software is used to exploit effectively the power-saving techniques built into the hardware.

Energy-Conserving Software (ECS) uses predictive and/or a priori techniques to determine the varying run-time workload needed by the processor (or processors) and other Power-Managed Components (PMCs), i.e. programmable hardware modules, within a real-time embedded electronic system. The ECS uses the workload estimations to set Performance-Power (PP) settings (or states) of the PMCs dynamically to levels high enough to deliver instantaneous performance needed to process the workload in time to meet real-time deadlines, but no higher than necessary, thereby minimising power wastage.

It therefore follows, in relation to the processor, that the PP states, for example operating clock frequency and operating voltage, of the processor ideally should be set just high enough to ensure that application programs and other critical software execute fast enough to meet real-time processing deadlines, but not higher than necessary, thereby avoiding wastage of power. Time leading up to the real-time deadline not required for workload processing constitutes so-called slack-time during which energy-saving measures, through setting of the PP states, can potentially be invoked. Further, for optimal energy conservation the PP states should be set in real-time as the workload, for example a software program, is being processed.

Unfortunately, there are penalties or 'costs' in both power consumption and time in transitioning between PP states of a given piece of hardware. These costs can easily outweigh the (energy-saving) benefits of the PP state to be used and so for optimal energy conservation some cost-benefit analysis should be performed in real-time to qualify a decision as to whether or not (and when) to make a particular transition to a potentially energy-saving PP state. Such cost-benefit analysis is described for various PP mechanisms, such as shutdown or idle modes, in public domain literature, for example: "A Survey of Design Techniques for System-Level Dynamic Power Management" (L. Benini, A. Bogliolo, G. De Micheli, IEEE Transactions On Very Large Scale Integration (VLSI) Systems, Vol. 8, No. 3, June 2000), "Energy-Conscious, Deterministic I/O Device Scheduling in Hard Real-Time Systems" (V. Swaminathan, K. Chakrabarty, IEEE Transactions On Computer-Aided Design Of Integrated Circuits And Systems, Vol. 22, No. 7, July 2003), or "Improving Energy Saving in Wireless Systems by Using Dynamic Power Management" (C. Chiasserini, R. R. Rao, IEEE Transactions On Wireless Communications, Vol. 2, No. 5, September 2003). However, in some energy conservation implementations no cost-benefit analysis is performed. Further, when present, the cost-benefit qualification is specific to a particular power-saving design employed by, and the fabrication characteristics of, the PP mechanism, i.e. a hardware-specific ad-hoc solution is employed that makes the ECS complex, hard to maintain and difficult to port to new hardware platforms.

STATEMENT OF INVENTION

According to the present invention, there is provided an electronic apparatus and a method of conserving energy as set forth in the appended claims.

BRIEF DESCRIPTION OF THE DRAWINGS

At least one embodiment of the invention will now be described, by way of example only, with reference to the accompanying drawings, in which.

DESCRIPTION OF PREFERRED EMBODIMENTS

Figure 1:
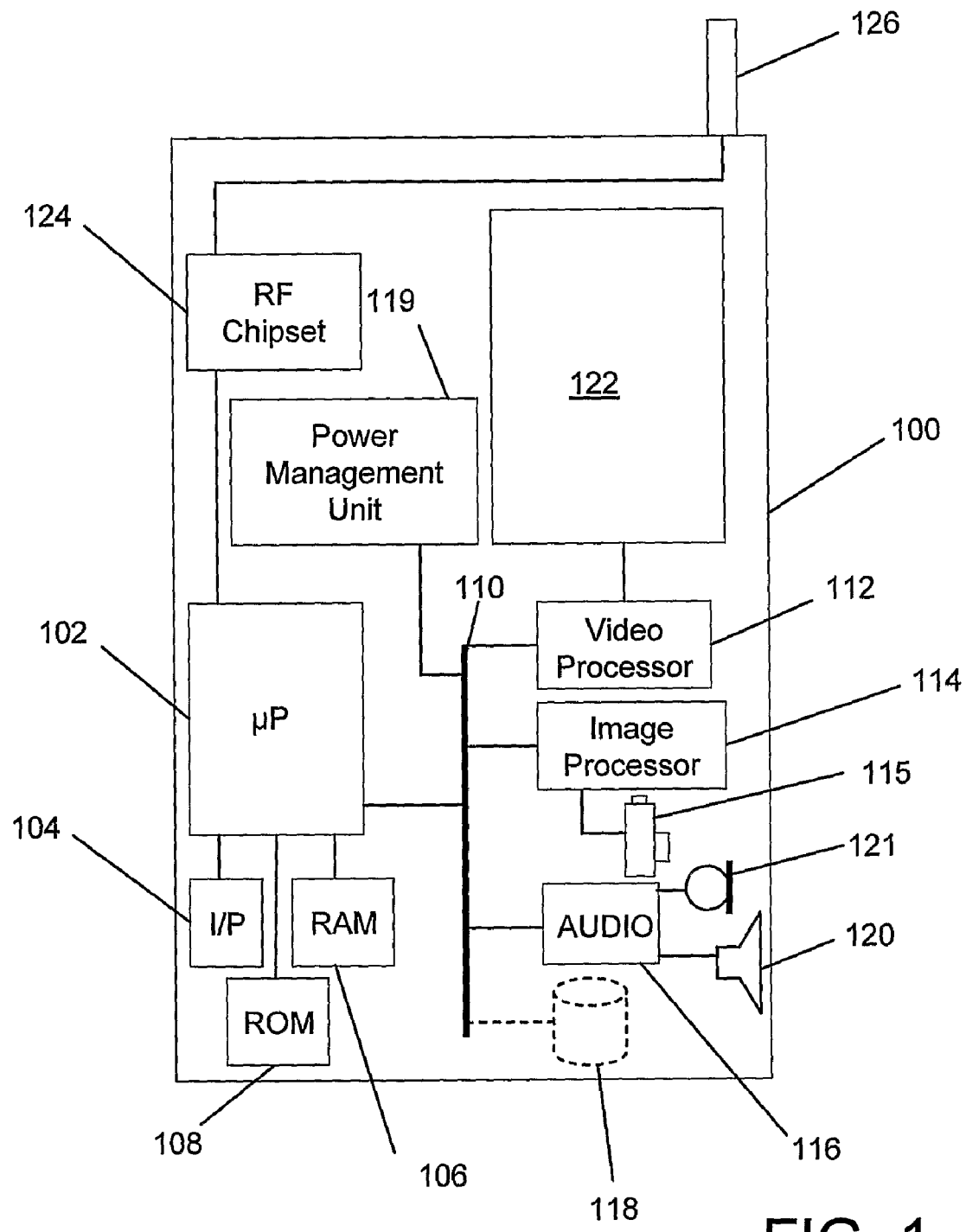
FIG. 1 is a schematic diagram of an electronic apparatus of FIG. 1.

Throughout the following description identical reference numerals will be used to identify like parts.

Referring to FIG. 1, a portable computing device, for example a so-called smartphone 100 constitutes a combination of a computer and a telecommunications handset. Consequently, the smartphone 100 comprises a processing resource, for example a processor 102 coupled to one or more input device 104, such as a keypad and/or a touch-screen input device. The processor 102 is also coupled to a volatile storage device, for example a Random Access Memory (RAM) 106, and a non-volatile storage device, for example a Read Only Memory (ROM) 108.

A data bus 110 is also provided and coupled to the processor 102, the data bus 110 also being coupled to a video processor 112, an image processor 114, an audio processor 116 a plug-in storage module, such as a flash memory storage unit 118, and a power management unit 119.

A digital camera unit 115 is coupled to the image processor 114, and a loudspeaker 120 and a microphone 121 are coupled to the audio processor 116. An off-chip device, in this example a Liquid Crystal Display (LCD) panel 122, is coupled to the video processor 112.

In order to support wireless communications services, for example a cellular telecommunications service, such as a Universal Mobile Telecommunications System (UMTS) service, a Radio Frequency (RF) chipset 124 is coupled to the processor 102, the RF chipset 124 also being coupled to an antenna 126.

The above-described hardware constitutes a hardware platform and the skilled person will understand that one or more of the processor 102, the RAM 106, the video processor 112, the image processor 114 and/or the audio processor 116 can be manufactured as one or more Integrated Circuit (IC), for example an application processor or a baseband processor (not shown).

Each of the processor 102, the RAM 106, the video processor 112, the image processor 114 and the audio processor 116 constitutes a Power Managed Component (PMC). Each of the PMCs comprises at least one power saving mechanisms (not shown) that is used in this example, by software in order to minimise power usage by the PMCs whilst maintaining a minimum level of performance required of each PMC to process, store, transfer, or otherwise manage, data within real-time output constraints or remain substantially inactive. Examples of power saving mechanisms include Dynamic Voltage Scaling, Dynamic Frequency Scaling, and/or one or more low-power idle modes.

Whilst the above example of the portable computing device has been described in the context of the smartphone 100, the skilled person will appreciate that other portable computing devices can constitute the portable computing device. Further, for the sake of the conciseness and clarity of description, only parts of the smartphone 100 necessary for understanding the embodiments herein are described; the skilled person will, however, appreciate that other technical details are associated with the smartphone 100.

Figure 2:
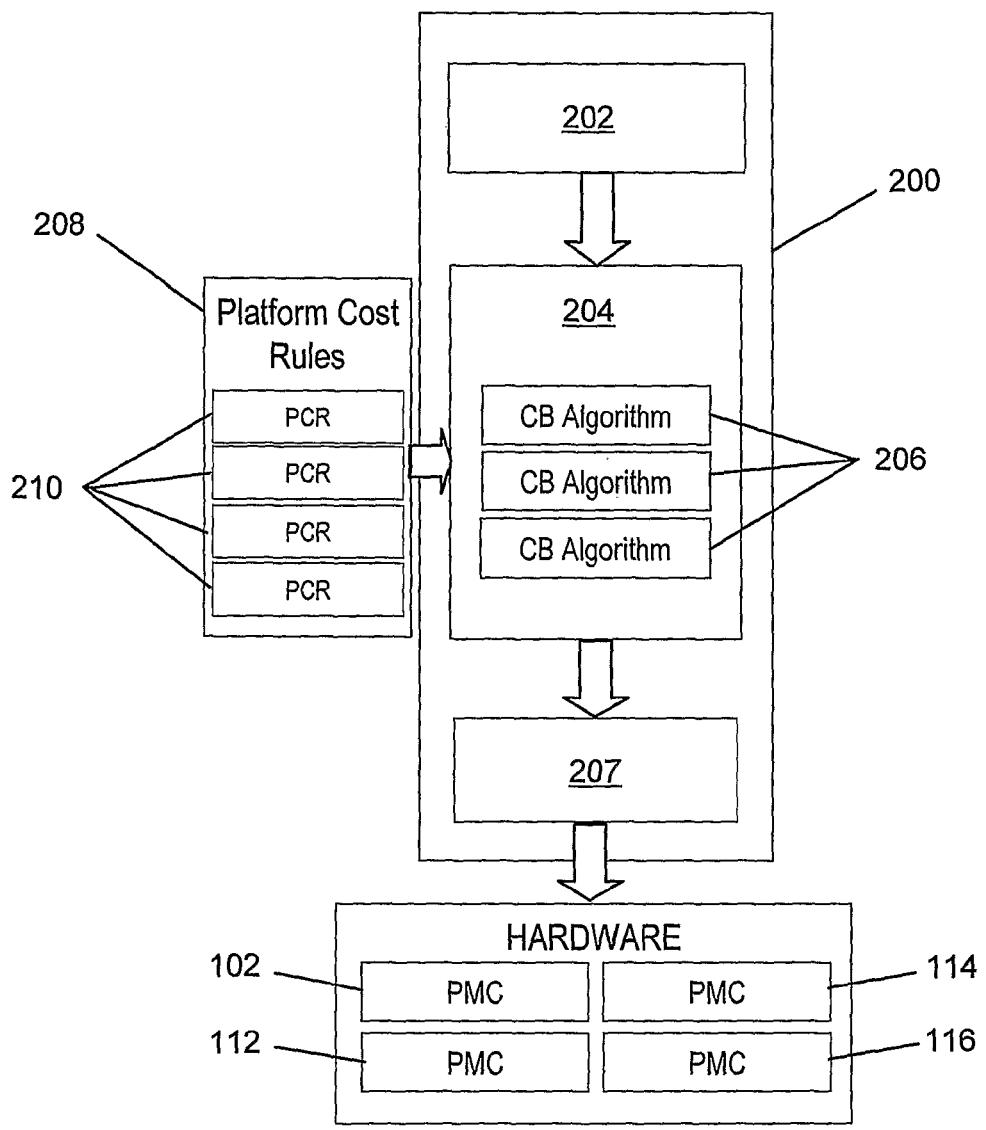
FIG. 2 is a schematic diagram of an energy-conserving module interfacing with hardware of FIG. 1.

Turning to FIG. 2, an energy-conserving module 200 is supported by and works closely with an operating system, for example Linux, running on the processor 102. The energy-conserving module 200 comprises a performance estimation module 202 capable of communicating with a cost-benefit qualifier module 204. The cost-benefit qualifier module 204 implements, when in use, one or more cost-benefit algorithms 206, and is also capable of communicating with a performance-setting module 207. The performance-setting module 207 is, in turn, capable of communicating with the PMCs 102, 106, 112, 114, 116 of the hardware platform in order to transition one or more of the PMCs 102, 106, 112, 114, 116, between respective two or more Performance-Power (PP) states.

In addition to supporting the energy-conserving module 200, a plurality of Platform Cost Rules (PCRs) 210 specific to the hardware platform resides with the energy-conserving module 200. The nature of the PCRs 210 will be described in greater detail later herein.

Figure 3:
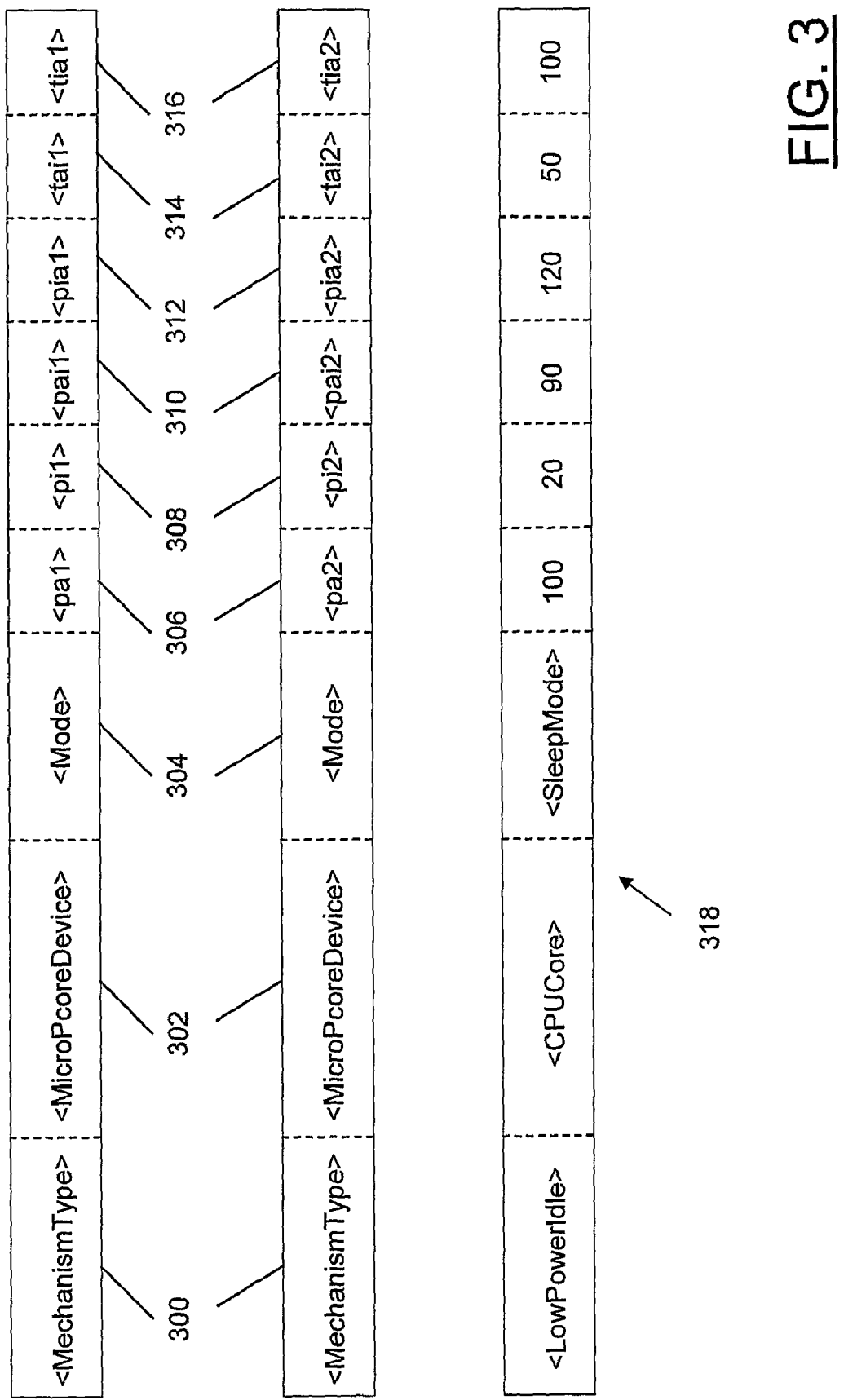
FIG. 3 is a schematic diagram of platform cost rules used by the energy-conserving module of FIG. 2.

In this example, each PCR is an array of nine fields (FIG. 3). A first field 300 is reserved to identify a Performance-Power (PP) mechanism type, for example a low-power idle mode mechanism, a dynamic frequency scaling mechanism or a dynamic voltage scaling mechanism. A second field 302 is reserved to identify a PMC to which the PCR refers, for example a microprocessor core. A third field 304 is reserved to identify a mode of operation of the PP mechanism type identified in the first field 300, for example a sleep mode or a doze mode. A fourth, fifth, sixth, seventh, eighth and ninth field 306, 308, 310, 312, 314, 316 constitute a fixed list of parametric arguments that characterise the PP mechanism and constitute a so-called Power State Model (PSM).

In the present example, parameters of the Power State Model (PSM) are: a power in an Active state ($P_a$), a power in an Inactive state ($P_i$), a power used to transition from the Active state to the Inactive state ($P_{ai}$), a power used to transition from the Inactive state to the Active state ($P_{ia}$), a time to transition from the Active state to the Inactive state ($T_{ai}$), and a time to transition from the Inactive state to the Active state ($T_{ia}$).

However, the generality of the PCRs is such that the skilled person will appreciate that a given PCR can comprise any number and type of parameters to support one or more PP mechanism, such as the Dynamic Voltage Scaling (DVS) mechanism and the Dynamic Frequency Scaling (DFS) mechanism. Further, a number of PCRs can be provided to support other PP mechanisms for one or more devices. In such circumstances, a PCR can be provided to characterise each discrete frequency and/or voltage level of the DFS and/or DVS mechanism and the parameters to define the PSM can vary in significance and number of fields. Since a wide variety of devices exist and new types of PP mechanism can be devised as well as existing PP mechanisms improved, the skilled person will also appreciate that the use of PCRs is flexible and not limited to a fixed list of PP mechanisms and/or devices. For example, the parametric arguments can define a set of operating points or a mathematical function that describes one or more relationship between power and performance of a given PP mechanism. It can therefore be seen that the one or more cost-benefit algorithm 206 is generic, but configurable using one or more PCR.

Figure 4:
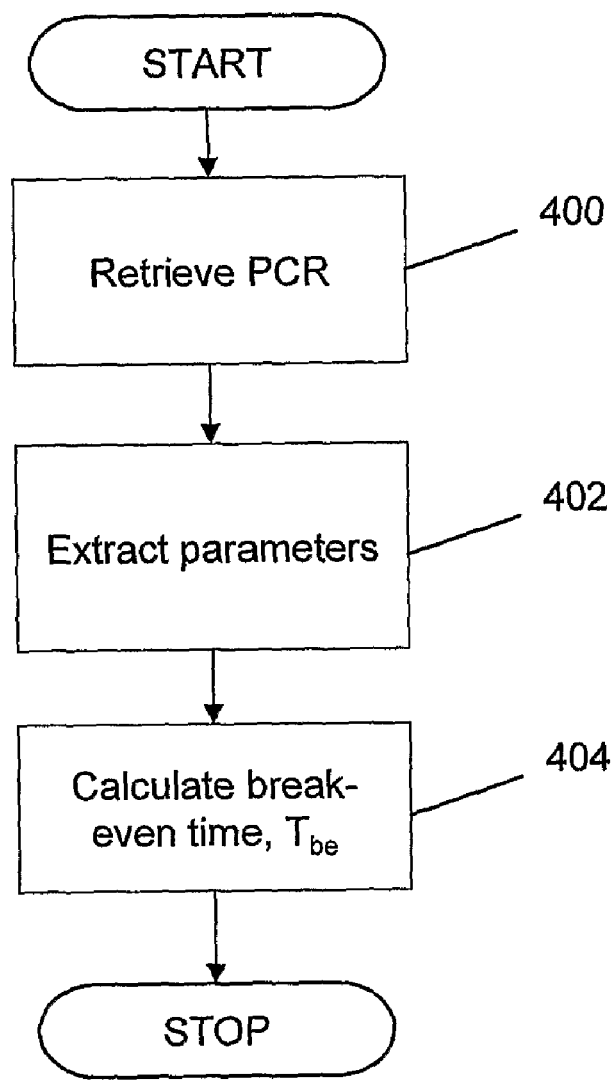
FIG. 4 is a flow diagram of an initialisation part of a method of conserving energy employed by the energy-conserving module of FIG. 2.

In operation (FIG. 4), a given software application, for example, a streamed video application is supported by the processor 102. The streamed video application is instructed, through user interaction, to receive and process real-time streamed video data. The streamed video data is, in this example, obtained from a cellular communications network with which the smartphone 100 is connected using the RF chipset 124 of the smartphone 100. However, the skilled person will appreciate that the video data can be obtained through other means, for example, a locally-stored video file.

The received data is organised as frames of video data resulting in the video application processing each frame of data sequentially. Processing of one or more frame of data or inactivity when not processing the one or more frame of data constitutes, herein, a processing function. In order to process a given frame of data, the performance estimation module 202 of the energy-conserving module 200 employs known PP estimation techniques, for example, a process utilisation history algorithm to determine (Step 400) a level of performance required to process the given frame of data.

In an Active state (run mode), the processor 102 processes the video data. After processing a first frame of video data, an idle time can exist until the processor 102 has to process a subsequent frame of the video data.

Consequently in this example, the processor 102 has an idle mode into which the processor 102 can enter in order to make use of the idle time to conserve energy, a PCR 318 accessible by the energy-conserving module 200 comprising power characteristics of the idle mode with respect to the run mode of the processor 102.

In this example the parameters of the idle mode of the processor 102 are fixed because the parameters relate to the hardware design characteristics of the processor 102. Hence, referring to FIG. 4, the PCR 318 can be retrieved (Step 400) by the energy-conserving module 200 at start-up of the smartphone 100 and the parameters of the PCR 318 extracted (Step 402) (reproduced in Table I below) and used by one (or more) of the cost-benefit algorithms 206, for example to calculate (Step 404) a break-even time constituting a second duration, $T_{be}$.

TABLE I

| POWER STATE MODEL (PSM) PARAMETERS | | | | Normalised | |
|---|---|---|---|---|---|
| Parameter | Value | Unit | Description | Values | Units |
| $P_a$ | 100 | mW | Power in Active state (run mode) | 0.1 | W |
| $P_i$ | 20 | mW | Power in Inactive state (Sleep mode) | 0.02 | W |
| $P_{ai}$ | 90 | mW | Power to transition from Active to Inactive state | 0.09 | W |
| $P_{ia}$ | 120 | mW | Power to transition from Inactive to Active state | 0.12 | W |
| $T_{ai}$ | 50 | μsec | Time to transition from Active to Inactive state | 0.00005 | S |
| $T_{ia}$ | 100 | μsec | Time to transition from Inactive to Active state | 0.0001 | s |

In this example, the one of the cost-benefit algorithms 206 implements the following equation:

$$T_{be} = T_{ai}\frac{(P_{ai} - P_i)}{(P_a - P_i)} + T_{ia}\frac{(P_{ia} - P_i)}{(P_a - P_i)}$$

where: $T_{be}$ is a break-even duration;

$T_{ai}$ is a time taken to transition from the Active state (run mode) to the Inactive state (Sleep mode);

$T_{ia}$ is a time taken to transition from the Inactive state to the Active state;

$P_{ai}$ is a power used to transition from the Active state to the Inactive state;

$P_{ia}$ is a power used to transition from the Inactive state to the Active state;

$P_a$ is a power used by the processor 102 when in the Active state; and $P_i$ is a power used by the processor 102 when in the Inactive state.

Evaluation of the above equation is shown in Table II below:

TABLE II

| Variable | Units | Significance | Calculated Values |
|---|---|---|---|
| $E_a$ | J | Energy that would be used during the slack time, $T_i$, if the PMC remains in the Active state | 0.000020 J |
| $E_i$ | J | Energy that would be used during the slack time, $T_i$, if the PMC enters into the Inactive state | 0.000018 J |
| $E_s$ | J | Energy Saved or Wasted by entering the Inactive state ($E_a - E_i$) | 0.000003 J |
| $T_{be}$ | Sec | Duration of PMC in the Inactive state needed to consume the same amount of energy as if the PMC had remained in the Active state (the break-even time), i.e. $T_i = T_{be}$ when $E_a = E_i$ | 0.00017 sec |

Figure 5:
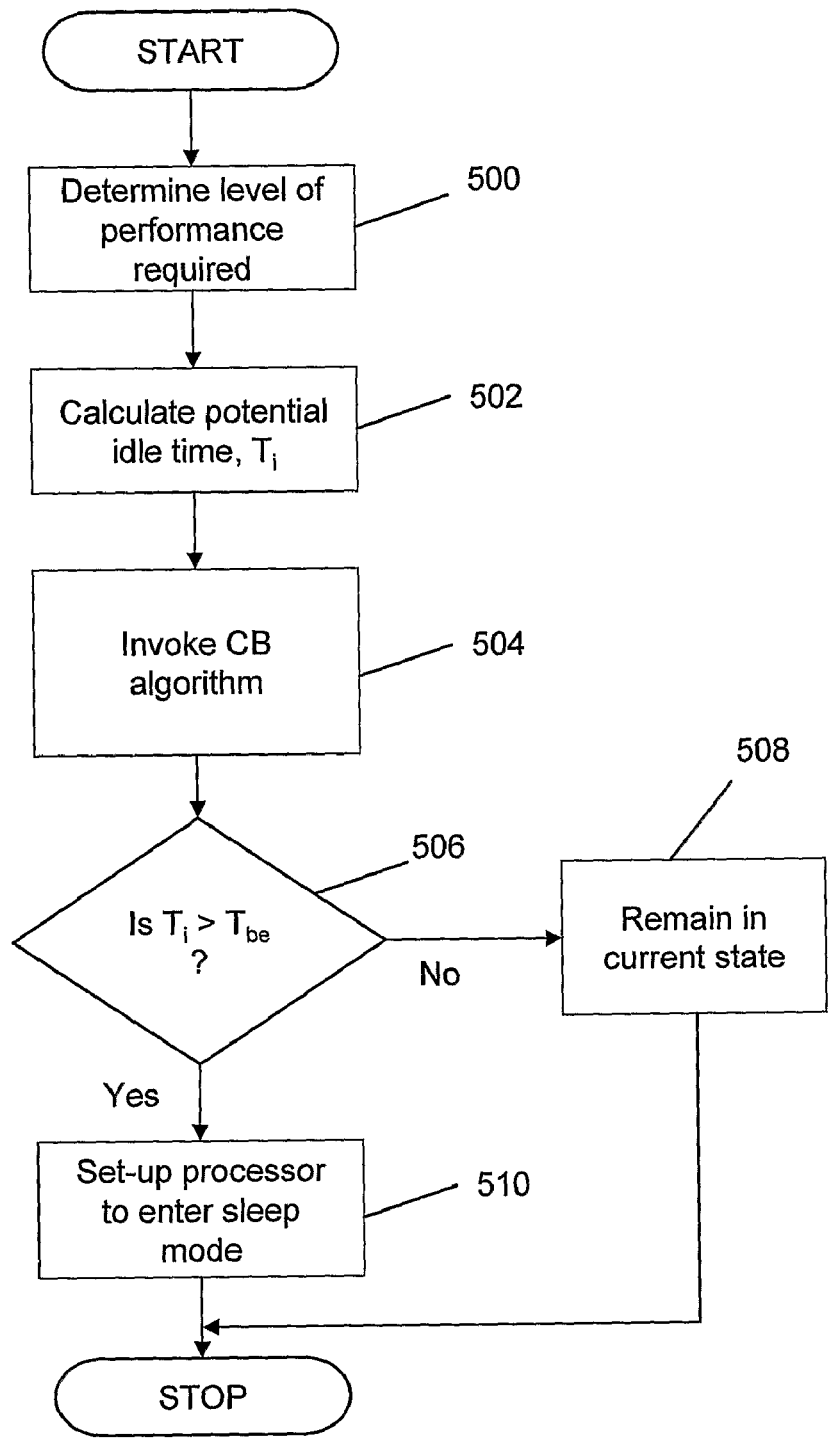
FIG. 5 is a flow diagram of a run-time part of the method of conserving energy employed by the energy-conserving module of FIG. 2.

Referring to FIG. 5, the performance estimation module 202 periodically estimates (Step 500), in accordance with the PP estimation technique implemented by the performance estimation module 202, a level of performance required of the processor 102 by the video application using any suitable known estimation technique. Additionally, a first duration, constituting a period of time during which workload processing is not required of the processor 102, is calculated (Step 502). In the case of the idle time between processing of the frames described above, the performance estimation module 202 provides to the cost-benefit qualifier module 204 the level of performance required and a so-called slack time, $T_i$, corresponding to the first duration. The slack time is, in this example, a potential idle time for the processor 102 and is determined by the performance estimation module 202 to be 200 μs. The cost-benefit qualifier module 204 then invokes (Step 504), if required, one or more of the cost-benefit algorithms 206 in order to evaluate parameters recorded as the PCR 318. In the present example, the PCR 318 only comprises parameters that, as mentioned above, are set during design of the processor 102 and so has already been evaluated by the calculation of the break-even time, $T_{be}$. However, in some embodiments PCRs can be used by one or more cost-benefit algorithm 206 that also requires one or more parameter only obtainable during run-time of the processor 102.

The cost-benefit qualifier module 204 then determines (Step 506) whether the slack time, $T_i$, is greater than the break-even time, $T_{be}$. If the slack time is not greater than the break-even time, $T_{be}$, the cost-benefit qualifier module 204 instructs (Step 508) the performance-setting module 207 to keep the processor 102 in the run mode and takes no further action until a new estimated performance level is communicated from the performance estimation module 202 to the cost-benefit qualifier module 204.

Hence, as can be seen from Table II above for this example, the slack time, $T_i$, (200 μs) is greater than the break-even time, $T_{be}$, of approximately 168.75 μs. Therefore, if the processor 102 were to enter into and remain in the sleep mode, continuance of the processor 102 in the sleep mode after 168.75 μs would result in a net energy saving. Consequently, the cost-benefit qualifier module 204 sets (Step 510) the processor 102 to enter the sleep mode at a beginning of the slack time.

In another example, a new slack time, $T_i$=50 μs, as calculated by the performance estimation module 202 during a subsequent performance estimation cycle is only 50 µs. However, the parameters of the processor 102 remain unchanged and so the energy-consumption statistics associated with the processor 102 also remain unchanged as shown in Table III below. Since the break-even time remains at 168.75 µs, i.e. greater than the new slack time, transition of the processor 102 into the sleep mode for only 50 µs would result in a net loss of energy as compared to energy consumed by maintaining the processor 102 in the current, run, mode. Consequently, the cost-benefit qualifier module 204 does not set the processor 102 to enter into the sleep mode.

Whilst the above examples have been described in the context of the processor 102 only having the sleep mode, the skilled person will appreciate that the above-described hardware and/or modules can be used to control other energy-saving mechanisms, for example an idle mechanism having two or more modes. Similarly, the hardware, for example the processor 102, can have multiple energy-conserving mechanisms for the Active state, each energy-conserving mechanism optionally having one or more respective PP state.

In such embodiments, a PCR is provided for each mode of the mechanism and the plurality of PCRs is processed by one or more cost-benefit algorithm 206. Where more than one cost-benefit algorithm 206 is evaluated resulting in a number of energy-saving candidate modes that can be set for the processor 102 (or other PMC), an optimum energy-saving mode is selected.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It is thus possible to provide an electronic apparatus and method of conserving energy that ensures that a benefit of switching PP states is not outweighed by any energy use costs involved in making such a transition. Hence, optimal time to switch PP states is determined. Where a PMC has two or more energy-saving mechanisms, it is possible to determine, "on the fly" which of the various energy-saving mechanisms to use in preference to other energy-saving mechanisms available in order to achieve optimal overall energy conservation. Further, the method and apparatus is not dependent upon characteristics of the design of the PMCs and/or silicon process used to fabricate the PMCs. Consequently, the apparatus and method perform real-time analysis whilst remaining highly portable across many hardware platforms. The apparatus is therefore less complex and cheaper to produce. Additionally, the method and apparatus benefit from ease of implementation, maintenance and enhancement. Of course, the above advantages are exemplary, and these or other advantages may be achieved by the invention. Further, the skilled person will appreciate that not all advantages stated above are necessarily achieved by embodiments described herein.

The invention claimed is:

1. An electronic apparatus comprising:
a hardware element arranged to operate in a first energy usage mode for providing a first level of performance, the hardware element having a second energy usage mode for providing a second level of performance;
an energy-conservation module arranged to determine a performance level required of the hardware element based on a platform cost rule for the hardware element and a first duration for providing the performance level, wherein the platform cost rule includes a plurality of fields identifying parameters for the hardware element including a first field identifying that a power mechanism associated with the hardware element uses dynamic frequency scaling or dynamic voltage scaling; and
a store comprising data associated with the hardware element transitioning between the first energy usage mode and the second energy usage mode, the data characterising power use and performance;
wherein the energy conservation module is arranged to use the data to determine whether an energy saving is achievable should the hardware element transition into the second energy usage mode and use the second energy usage mode in order to satisfy the performance level required during the first duration.

2. An apparatus as claimed in claim 1, wherein the performance level required is lower than the first level of performance.

3. An apparatus as claimed in claim 1, wherein the energy-conservation module is arranged to determine a break-even energy in relation to use of the second energy usage mode for providing the second level of performance.

4. An apparatus as claimed in claim 3, wherein the break-even energy corresponds to a second duration that, when exceeded, results in the energy saving.

5. An apparatus as claimed in claim 1, wherein the energy-conservation module is arranged to permit use of the second energy usage mode in response to the energy-conservation module determining that use of the second energy usage mode results in the energy saving.

6. An apparatus as claimed in claim 4, wherein the energy-conservation module is arranged to permit use of the second energy usage mode in response to the first duration exceeding the second duration.

7. An apparatus as claimed in claim 1, wherein the energy-conservation module is arranged to determine whether use of the second energy usage mode results in the energy saving using a first at least one parameter relating to transitioning into the second energy usage mode.

8. An apparatus as claimed in claim 1, wherein the energy-conservation module is arranged to determine whether use of the second energy usage mode results in the energy saving using a second at least one parameter relating to transitioning out of the second energy usage mode.

9. An apparatus as claimed in claim 7, wherein the first at least one parameter is selected from at least one of:
a time to transition into the second energy usage mode;
a power used to transition into the second energy usage mode;
power used by the hardware element when in the second energy usage mode; and/or
power used by the hardware element when in the first energy usage mode.

10. An apparatus as claimed in claim 8, wherein the second at least one parameter is selected from at least one of:
a time to transition out of the second energy usage mode;
power used to transition out of the second energy usage mode;
power used by the hardware element in the second energy usage mode; and/or
power used by the hardware element when in the first energy usage mode.

11. An apparatus as claimed in claim 9, wherein the energy conservation module employs a following formula to determine whether use of the second energy usage mode results in the energy saving:

$$T_{be} = T_{ai}\frac{(P_{ai} - P_i)}{(P_a - P_i)} + T_{ia}\frac{(P_{ia} - P_i)}{(P_a - P_i)}$$

where: $T_{be}$ is an energy break-even interval;
$T_{ai}$ is the time taken to enter into the second energy usage mode;
$T_{ia}$ is a time taken to leave the second energy usage mode;
$P_{ai}$ is the power used to enter into the second energy usage mode;
$P_{ia}$ is a power used to leave the second energy usage mode;
$P_a$ is the power used by the hardware element when in the first energy usage mode; and
$P_i$ is the power used by the hardware element when in the second energy usage mode.

12. An apparatus as claimed in claim 1, wherein the first and second energy usage modes are provided by a same energy-saving mechanism supported by the hardware element.

13. An apparatus as claimed in claim 1, wherein the first energy usage mode is provided by a first energy-saving mechanism supported by the hardware element and the second energy usage mode is provided by a second energy-saving mechanism supported by the hardware element.

14. An apparatus as claimed in claim 12, wherein the same energy-saving mechanism is scalable.

15. An apparatus as claimed in claim 1, wherein the energy-conservation module implements at least one generic algorithm and uses the data in conjunction with the at least one generic algorithm to determine whether use of the second energy usage mode results in the energy saving, the at least one generic algorithm relating to a hardware implementation comprising the hardware element.

16. An apparatus as claimed in claim 15, wherein the at least one of the at least one generic algorithm is arranged to apply the data to determine whether use of the second energy usage mode results in the energy saving.

17. An apparatus as claimed in claim 1, wherein the data is loadable by the energy-conservation module.

18. A method of conserving energy used by a hardware element in an electronic apparatus, the method comprising the steps of:
providing the hardware element with a first energy usage mode for providing a first level of performance, and a second energy usage mode for providing a second level of performance;
determining a performance level required of the hardware element based on a platform cost rule for the hardware element and a first duration for providing the performance level, wherein the platform cost rule includes a plurality of fields identifying parameters for the hardware element including a first field identifying that a power mechanism associated with the hardware element uses dynamic frequency scaling or dynamic voltage scaling; and
providing data associated with the hardware element transitioning between the first energy usage mode and the second energy usage mode, the data characterising power use and performance;
wherein using the data to determine whether an energy saving is achievable should the hardware element transition into the second energy usage mode and use the second energy usage mode in order to satisfy the performance level required during the first duration.

19. A non-transitory computer readable medium including computer code whose execution causes a computer to perform the steps comprising:
providing the hardware element with a first energy usage mode for providing a first level of performance and a second energy usage mode for providing a second level of performance;
determining a performance level required of the hardware element based on a platform cost rule for the hardware element and a first duration for providing the performance level, wherein the platform cost rule includes a plurality of fields identifying parameters for the hardware element including a first field identifying that a power mechanism associated with the hardware element uses dynamic frequency scaling or dynamic voltage scaling; and
providing data associated with the hardware element transitioning between the first energy usage mode and the second energy usage mode, the data characterising power use and performance;
wherein using the data to determine whether an energy saving is achievable should the hardware element transition into the second energy usage mode and use the second energy usage mode in order to satisfy the performance level required during the first duration.

20. An apparatus as claimed in claim 1, wherein the plurality of fields identifying parameters for the hardware element further includes a second field identifying the hardware element associated with the platform cost rule, a third field identifying a mode of operation for the power mechanism, and additional fields identifying a list of parametric arguments that constitute a power state model.

\* \* \* \* \*